United States Patent
Konig et al.

(10) Patent No.: US 7,328,948 B2
(45) Date of Patent: Feb. 12, 2008

(54) CHILD SEAT

(75) Inventors: Walter Konig, Münsingen (DE); Uwe Schobert, Kirchenlamitz (DE); Bernhard Hahnel, Berlin (DE)

(73) Assignee: Concord GmbH, Stadtsteinach (DE)

( * ) Notice: Subject to any disclaimer, the term of this patent is extended or adjusted under 35 U.S.C. 154(b) by 0 days.

(21) Appl. No.: 10/562,848

(22) PCT Filed: Jun. 30, 2004

(86) PCT No.: PCT/DE2004/001367

§ 371 (c)(1),
(2), (4) Date: Sep. 5, 2006

(87) PCT Pub. No.: WO2005/002907

PCT Pub. Date: Jan. 13, 2005

(65) Prior Publication Data

US 2007/0080567 A1    Apr. 12, 2007

(30) Foreign Application Priority Data

Jul. 2, 2003    (DE) .............................. 103 29 921

(51) Int. Cl.
*A47C 1/08* (2006.01)

(52) U.S. Cl. ............................. 297/256.1; 297/256.13; 297/256.16

(58) Field of Classification Search ............. 297/256.1, 297/256.13, 256.16, 250.1
See application file for complete search history.

(56) References Cited

U.S. PATENT DOCUMENTS

| | | | |
|---|---|---|---|
| 4,709,960 A * | 12/1987 | Launes | 297/256.13 |
| 5,524,965 A * | 6/1996 | Barley | 297/256.16 |
| 5,609,393 A | 3/1997 | Meeker et al. | |
| 5,746,478 A * | 5/1998 | Lumley et al. | 297/256.13 |
| 6,196,629 B1 * | 3/2001 | Onishi et al. | 297/256.12 |
| 6,428,099 B1 * | 8/2002 | Kain | 297/256.1 |
| 6,705,676 B1 * | 3/2004 | Berringer et al. | 297/256.16 |
| 6,857,700 B2 * | 2/2005 | Eastman et al. | 297/250.1 |
| 7,104,603 B2 * | 9/2006 | Keegan et al. | 297/256.13 |
| 7,232,185 B2 * | 6/2007 | Hartenstine et al. | 297/250.1 |

FOREIGN PATENT DOCUMENTS

| | | |
|---|---|---|
| DE | 42 04 228 A1 | 8/1993 |
| DE | 94 21 432 U1 | 9/1995 |
| DE | 200 17 448 U1 | 1/2001 |
| EP | 0 325 352 A2 | 7/1989 |
| EP | 0 640 508 A1 | 3/1995 |
| WO | WO 96/01748 | 1/1996 |

* cited by examiner

*Primary Examiner*—David Dunn
*Assistant Examiner*—Erika Garrett
(74) *Attorney, Agent, or Firm*—Schweitzer Cornman Gross & Bondell LLP

(57) ABSTRACT

A child seat (10) is described with a seat shell (14) which can be displaced between different positions on a base part (12). An actuating handle (26) is provided on the front edge (30) of the seat shell (14) and is connected to a locking device (36) by means of which the seat shell (14) is secured in one of the different positions with respect to the base part (12) in the normal inoperative state of the actuating handle (26) and can be displaced by actuation of the actuating handle (26). In order to realize a child seat (10) of excellent maneuverability and optimum operating convenience, the actuating handle (26) is designed as a rotary handle (28) which can be rotated about an axis of rotation (32) parallel to the front edge (30) of the seat shell (14), and which at the same time forms a displacing handle.

7 Claims, 3 Drawing Sheets

CHILD SEAT

Figure 1:
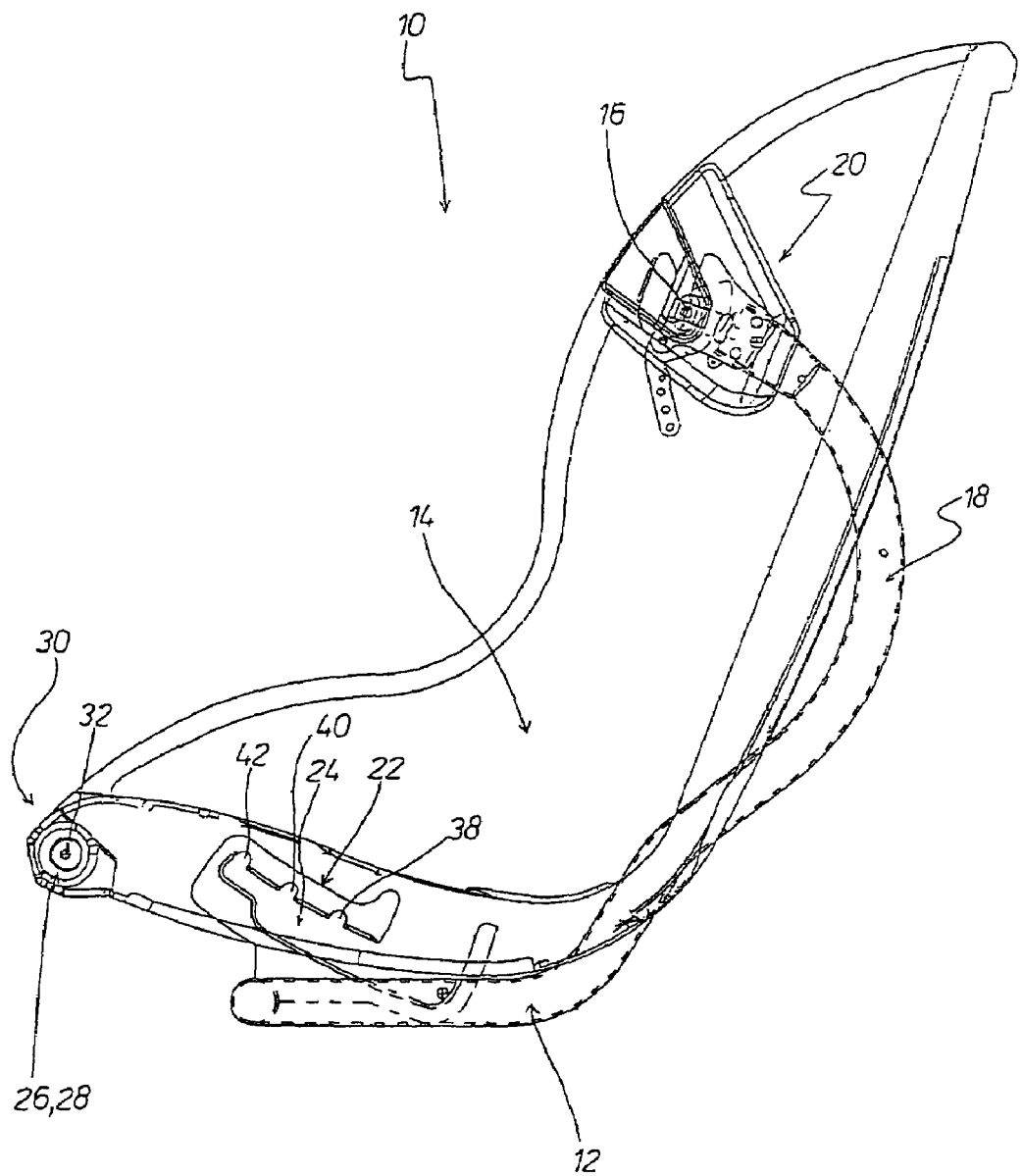

The invention relates to a child seat with a seat shell which can be displaced to and fro between different positions (sitting position, reclining position, intermediate position(s)) on a base part, an actuating handle being provided on the front edge of the seat shell and being connected to a locking device by means of which the seat shell is secured in one of the different positions with respect to the base part in the normal inoperative state of the actuating handle and can be displaced by actuation of the actuating handle.

In the case of a known child seat of this type, the unlocking device is designed in such a manner that the displacement of the seat shell with respect to the base part is scarcely possible with just one hand or is possible only with a great effort. The convenience of maneuvering this known child seat therefore leaves something to be desired.

WO 96/01748 A1 discloses a child seat with a seat shell which can be displaced to and fro between different positions (sitting position, reclining position, intermediate position(s)) on a base part, an actuating handle being provided on the front edge of the child seat and being connected to a locking device by means of which the seat shell is secured in one of the different positions with respect to the base part in the normal inoperative state of the actuating handle and can be displaced by actuation of the actuating handle. The actuating handle there is designed as a pivoting handle, is oriented parallel to the front edge of the seat shell, and can be displaced from the normal locking position into an unlocking position and back from there into the locking position by means of a restoring spring device.

DE 94 21 432 U1 discloses a child seat with a base and a seat shell which can be displaced and fixed relative to the base. The seat shell or the base has at least one integrally formed guide projection for guiding the seat shell on the base. At least one guide groove formed directly on the base or on the seat shell is provided for receiving the guide projection which is guided in the guide groove during displacement of the seat shell relative to the base. The seat shell is held directly on the base.

DE 200 17 448 U1 discloses a child seat which has a frame, a seat and a blocking device. The frame has a projection on the bottom and a respective round depression on both sides for the blocking device, next to which a latching groove is provided and the bottom of which is provided with a first and a second curved slot. The first curved slot is connected respectively in the upper and lower dead-center positions to an upper and lower positioning groove. On the lower side, the seat has a front pivot lever and a rear pivot lever, the end of the front pivot lever passing through the second curved slot and being coupled to the blocking device. The end of the rear pivot lever is coupled to the frame. The blocking device has a rotary disc which is accommodated in the round depression.

The invention is based on the object of providing a child seat of the type mentioned at the beginning which is of simple design and in which the seat shell can be displaced to and fro between the different positions in a simple and effort-saving manner.

According to the invention, this object is achieved in the case of a child seat of the type mentioned at the beginning in that the actuating handle is designed as a rotary handle which can be rotated about an axis of rotation, which is at least approximately parallel to the front edge of the seat shell, from the normal locking position into an unlocking position and from there back into the locking position by means of a restoring spring device, and which at the same time forms a maneuvering and displacing handle in the unlocking position to displace the seat shell with respect to the base part, a slotted-guide device being provided on the base part and having at least one slotted-guide path which is designed with latching recesses for the different positions of the seat shell with respect to the base part, and in that the locking device having a connecting device, which is connected to the rotary handle, with at least one guide element guided along the at least one slotted-guide path and with at least one latching element matched to the latching recesses.

The design of the actuating handle as a rotary handle with which an unlocking of the seat shell with respect to the base part takes place by means of rotation, with the rotary handle in the unlocking position at the same time forming a maneuvering handle for displacing the seat shell with respect to the base part, results in simple maneuverability of the child seat according to the invention.

It has proven advantageous in the case of the child seat according to the invention if the rotary handle is provided in a cutout formed on the front edge of the seat shell. This cutout can be at least partially covered by a covering of the child seat.

According to the invention, a slotted-guide device is provided on the base part and has at least one slotted-guide path which is designed with latching recesses for the different positions of the seat shell with respect to the base part, and the locking device has a connecting device which is connected to the rotary handle and has at least one guide element guided along the at least one slotted-guide path and at least one latching element matched to the latching recesses.

In this case, the connecting device can have a first connecting part having the at least one guide element and the at least one latching element and a second connecting part protruding away rigidly from the rotary handle, the connecting parts being connected pivotably to each other. For the pivotable connection, the first connecting part, on its end section remote from the slotted-guide device, can be formed with an elongated hole through which a spindle which protrudes away from the second connecting part extends.

It is expedient if the first connecting part is designed as a plate element and if the second connecting part is formed by two side tabs which protrude away rigidly from the mutually remote ends of the rotary handle. A design of this type affords the advantage of desired mechanical stability and operational reliability.

In the case of the child seat according to the invention, the restoring spring device can have at least one spring element assigned to the connecting device. Similarly, it is possible for the restoring spring device to have at least one spring element assigned to the rotary handle.

It has proven advantageous if the base part has two frame side parts which protrude upward at the rear and on the upper ends of which a pivot axis for the seat shell is provided, about which the seat shell can be pivoted between the different positions. Such a design of the last-mentioned type affords the considerable advantage that the pivot axis about which the seat shell can be pivoted is at a large distance from the rotary handle for unlocking and for displacing the seat shell, with the result that at a predetermined torque for the seat shell, the displacement force is correspondingly small. This means that the effort for displacing the seat shell is comparatively small in the case of the child seat according to the invention. Consequently, there is great maneuvering convenience in an advantageous manner.

Further details, features and advantages emerge from the description below of essential details of the child seat according to the invention.

Figure 2:
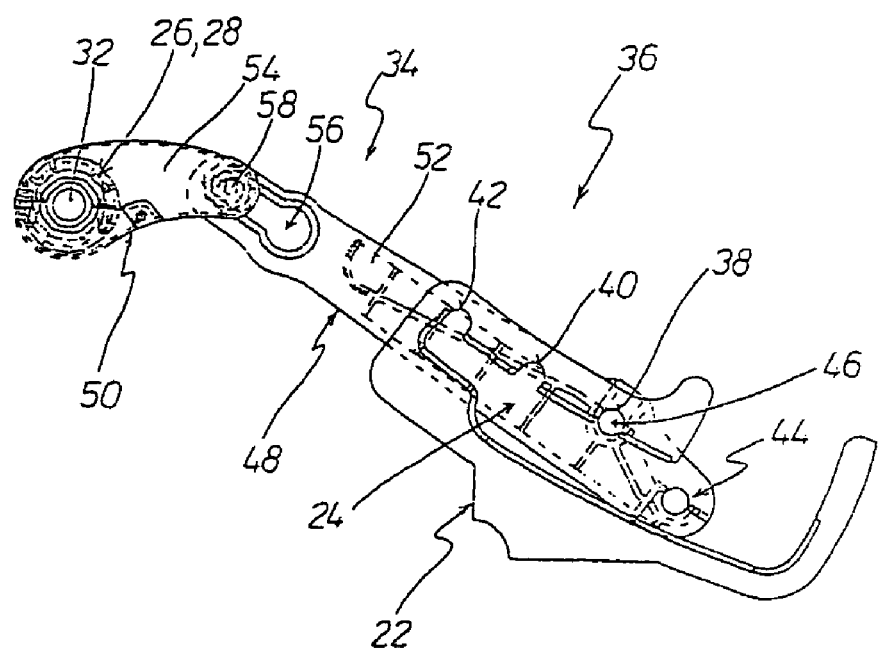
Figure 3:
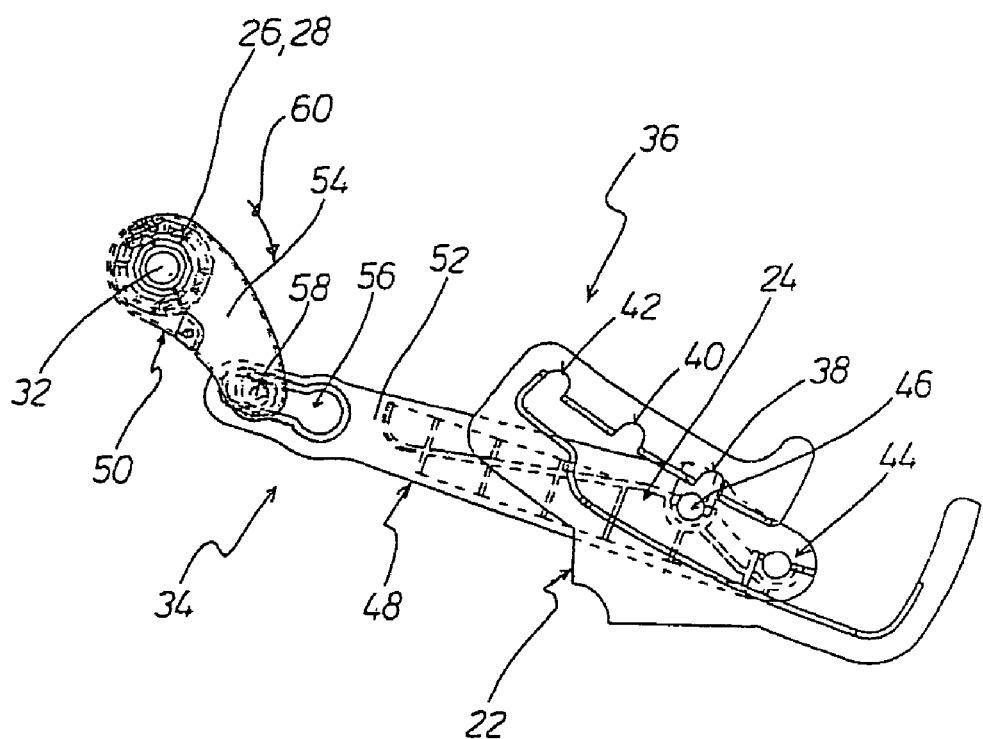
Figure 4:
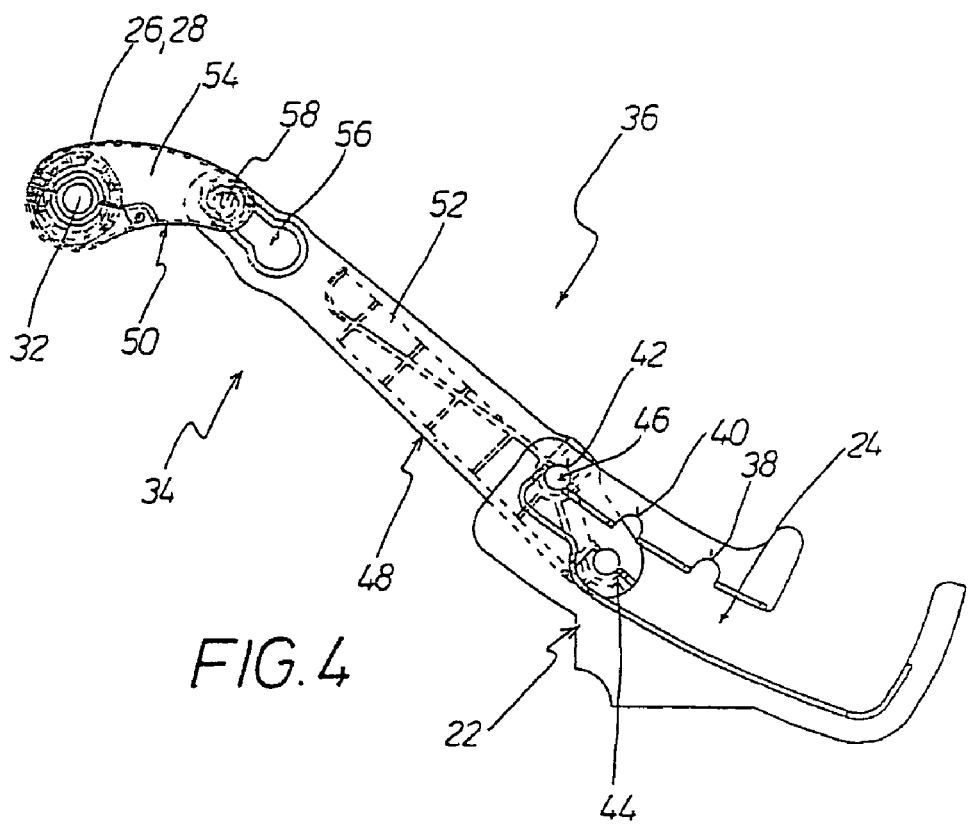
Figure 5:
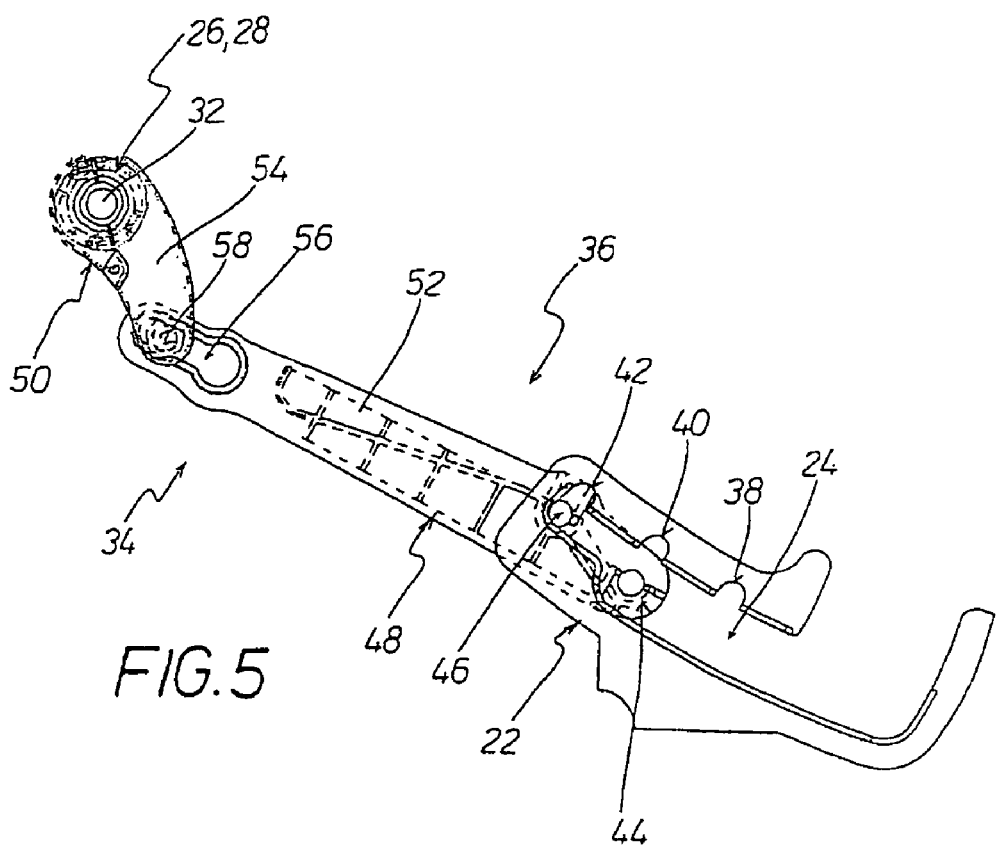

In the drawing:

FIG. 1 shows, diagrammatically in a side view, a design of the child seat and essential details of the same, FIG. 2 shows a design of the connecting device between the rotary handle provided on the seat shell and the slotted-guide device fastened to the base part, in a side view-in the sitting-position latching position, FIG. 3 shows an illustration similar to FIG. 2 of the connecting device in the sitting-position unlatching position, FIG. 4 shows an illustration similar to FIGS. 2 and 3 of the connecting device in the reclining-position latching position, and FIG. 5 shows a side view similar to FIGS. 2 to 4 of the connecting device in the reclining-position unlatching position.

FIG. 1 shows, diagrammatically in a side view, a design of the child seat 10 and of essential parts of the same. The child seat 10 has a base part 12 on which a seat shell 14 can be displaced to and fro between different positions, such as a sitting position, a reclining position and at least one intermediate position. The seat shell 14 can be displaced between said positions with respect to the base part 12 about a pivot axis 16. The base part 12 has two frame side parts 18 protruding upward at the rear. The pivot axis 16 is provided on the upper ends 20 of the frame side parts 18.

A slotted-guide device 22 protrudes away from the base part 12 and by means of it the different positions of the seat shell 14 with respect to the base part 12 are defined. The slotted-guide device 22 has two congruent slotted-guide paths 24 spaced apart laterally from each other. The slotted-guide paths 24 are designed in the shape of a circular arc. The center point of the curvature of the slotted-guide paths 24 is situated in the pivot axis 16.

The slotted-guide device 22 is described in detail further below in conjunction with FIGS. 2 to 5.

In order to displace the seat shell 14 with respect to the base part 12, the child seat 10 has an actuating handle 26 which is designed as a rotary handle 28. The rotary handle 28 can be rotated about an axis of rotation 32 parallel to the front edge 30 of the seat shell 14. The rotary handle 28 is connected to the slotted-guide device 22 by means of a connecting device 34, as is illustrated in FIGS. 2 to 5. The rotary handle 28, the connecting device 34 and the slotted-guide device 22 form a locking device 36 of the child seat 10. The illustration of the connecting device 34 has been omitted in FIG. 1.

FIG. 2, in a side view, illustrates the locking device 36 with the connecting device 34 between the rotary handle 28 and the slotted-guide device 22. The slotted-guide path 24 of the slotted-guide device 22 is designed with latching recesses 38, 40 and 42. A sitting position of the child seat 10 (see FIG. 1) is defined by the two lateral, congruent latching recesses 38. A reclining position of the seat shell 14 with respect to the base part 12 is defined by the latching recesses 42. An intermediate position between the sitting and reclining position of the seat shell 14 is defined by the latching recesses 40. The connecting device 34 has two lateral guide elements 44 guided along the two lateral slotted-guide paths 24, and latching elements 46 which are matched to the two laterally opposite latching recesses 38, 40, 42 and are spaced apart from the guide elements in a defined manner. In FIG. 4, the two laterally mutually remote latching elements 46 are latched into the latching recesses 38. The seat shell 14 is thereby fixed in the sitting position with respect to the base element 12 of the child seat 10.

The connecting device 34 has a first connecting part 48 and a second connecting part 50. The guide elements 44 and the latching elements 46 are provided on the first connecting part 48, which is designed as a plate element 52. The second connecting part 50 is formed by two side tabs 54 which protrude rigidly away from the mutually remote ends of the rotary handle 28.

The plate element 52 of the first connecting part 48 is designed with an elongated hole 56 into which a spindle 58 which connects the side tabs 54 to each other protrudes. This results in an articulated connection of the rotary handle 28 to the slotted-guide device 22.

FIG. 2 shows the locking device 36 in the sitting-position retaining position. By contrast, FIG. 3 illustrates the locking device 36 in the sitting-position latching position. This position arises if the rotary handle is pivoted in the clockwise direction about the axis of rotation 32, which is indicated in FIG. 3 by the curved arrow 60 which is concentric with the axis of rotation 32. In this unlatching position, the seat shell 14 can then be displaced as desired. For this purpose, the rotary handle 28 is maneuvered in an effort-saving manner, i.e. the rotary handle 28 is pulled or pushed in order to displace the seat shell 14 from the sitting position into the intermediate position defined by the latching recesses 40 or into the reclining or sitting position defined by the latching recesses 42. When the rotary handle 28 is released again after such a displacement, the locking device 38 is returned again into the normal locking position with the aid of a restoring spring device (not illustrated).

FIG. 4 illustrates the locking device 36 in the locked reclining position. By contrast, FIG. 5 illustrates the locking device 36 in the unlocking position of the reclining position. The same details are denoted in each case by the same reference numbers in FIGS. 1 to 5, and so it is unnecessary to describe all of the details in detail in each case in conjunction with all of the figures.

The invention claimed is:

1. A child seat with a seat shell which can be displaced to and fro between different positions (sitting position, reclining position, intermediate position(s)) on a base part, an actuating handle being provided on the front edge of the seat shell and being connected to a locking device by means of which the seat shell is secured in one of the different positions with respect to the base part in the normal inoperative state of the actuating handle and can be displaced by actuation of the actuating handle, the actuating handle being rotatable about an axis of rotation from the normal locking position into an unlocking position and being rotatable back from there into the locking position by means of a restoring spring device, and at the same time forming a displacing handle in the unlocking position to displace the seat shell with respect to the base part, characterized in that the actuating handle is designed as a rotary handle which can be rotated about an axis of rotation which, is at least approximately parallel to the front edge of the seat shell, from the normal locking position into an unlocking position and in that a slotted-guide device is provided on the base part and has at least one slotted-guide path which is designed with latching recesses for the different positions of the seat shell with respect to the base part, and the locking device has a connecting device, which is connected to the rotary handle, with at least one guide element guided along the at least one slotted-guide path and with at least one latching element matched to the latching recesses.

2. The child seat as claimed in claim 1, characterized in that the rotary handle is provided in a cutout formed on the front edge of the seat shell.

3. The child seat as claimed in claim 1, characterized in that the connecting device has a first connecting part having the at least one guide element and the at least one latching element and a second connecting part protruding away rigidly from the rotary handle, the connecting parts being connected pivotably to each other.

4. The child seat as claimed in claim 3, characterized in that the first connecting part is designed as a plate element and the second connecting part is formed by two side tabs which protrude away rigidly from the mutually remote ends of the rotary handle.

5. The child seat as claimed in claim 1, characterized in that the restoring spring device has at least one spring element assigned to the connecting device.

6. The child seat as claimed in claim 1, characterized in that the restoring spring device has at least one spring element assigned to the rotary handle.

7. The child seat as claimed in claim 1, characterized in that the base part has two frame side parts which protrude upward at the rear and on the upper ends of which a pivot axis for the seat shell is defined, about which the seat shell can be pivoted between the different positions.

* * * * *